United States Patent [19]

Dackow

[11] Patent Number: 4,575,865
[45] Date of Patent: Mar. 11, 1986

[54] SYSTEM FOR DETERMINING TIME DURATION OF ANGULAR ROTATION

[75] Inventor: Paul N. Dackow, Hillsborough Township, Somerset County, N.J.

[73] Assignee: RCA Corporation, Princeton, N.J.

[21] Appl. No.: 495,117

[22] Filed: May 16, 1983

[51] Int. Cl.[4] .............................. F02P 5/08; F02P 9/00
[52] U.S. Cl. ..................................... 377/20; 123/416; 307/515; 324/392
[58] Field of Search .......................... 123/416; 377/20; 307/515; 324/392

[56] References Cited

U.S. PATENT DOCUMENTS

| 3,745,364 | 7/1973 | Blank et al. | 377/20 |
| 4,104,997 | 8/1978 | Padgitt | 123/427 |
| 4,168,682 | 9/1979 | Gartner et al. | 123/416 |
| 4,181,884 | 1/1980 | Shirasaki et al. | 324/208 |
| 4,231,332 | 11/1980 | Wrathall | 123/416 |
| 4,262,526 | 4/1981 | Makita et al. | 123/416 |
| 4,262,644 | 4/1981 | Walker et al. | 123/418 |
| 4,300,518 | 11/1981 | Petrie | 123/609 |
| 4,303,977 | 12/1981 | Kobashi et al. | 364/431 |
| 4,329,959 | 5/1982 | Javeri | 123/416 |
| 4,375,209 | 1/1983 | Sinniger | 123/416 |
| 4,387,684 | 6/1983 | Javeri | 123/416 |

Primary Examiner—John S. Heyman
Attorney, Agent, or Firm—Joseph S. Tripoli; Robert L. Troike; Raymond E. Smiley

[57] ABSTRACT

A rotating member produces a signal corresponding to a given value M of angular rotation thereof. A clock produces pulses at a given rate. A counter mechanism is responsive to the signal and to the clock pulses for generating a number related to the number of clock pulses produced during a unit value X of rotation of the rotating member where X is unequal to M. The number may be used to determine when a value N of angular rotation has occurred.

5 Claims, 2 Drawing Figures

| LINE | ELEMENT 10 SPEED (RPM) | SEC./120° | CLOCK 30 PULSES/120° | COUNTER 44 AT END OF 120° | FRACTION IN COUNTER 34 AT END OF 120° | ROM 52 OUTPUT (N°) | ADVANCE (+) RETARD (−) |
|---|---|---|---|---|---|---|---|
| 1 | 1000 | 0.02 | 12000 | 100 | 0 | 60 | 0° |
| 2 | 2000 | 0.01 | 6000 | 50 | 0 | 52 | +8° |
| 3 | 500 | 0.04 | 24000 | 200 | 0 | 62 | −2° |
| 4 | 995 | 0.0201 | 12060 | 100 | 60 | 60 | 0° |

TABLE

Fig. 2

SYSTEM FOR DETERMINING TIME DURATION OF ANGULAR ROTATION

BACKGROUND OF INVENTION

This invention is concerned with a system for determining time duration of angular rotation and, more particularly, with a system for determining the time duration per unit amount of angular rotation given any known number of degrees of rotation.

There are a number of applications in which it is required to know the amount of time duration required for a rotating member to rotate through a given number of degrees. In particular, in a spark type internal combustion engine it is required to know when to fire the spark plug relative to some point in the rotation of the engine crankshaft. This firing point is termed spark advance or spark retard. The amount of advance or retard is determined by, among other things, how fast the engine crankshaft is rotating.

A prior art apparatus for determining engine speed is described in U.S. Pat. No. 4,375,209 issued Mar. 1, 1983 to A. D. Robbi, et al. and assigned to the common assignee. In the patented system, a rotating element similar to a distributor and coupled to the engine crankshaft produces start and stop pulses marking the beginning and ending of a fixed number of degrees of rotation. A clock produces pulses at a known fixed rate which are counted in a counter between the times of the start and stop pulses. The count in the counter, upon receipt of the stop pulse, represents the time for the total number of degrees of rotation. Based on this information, a number is chosen from a read only memory which, utilizing a second clock pulse source, effectively reduces the count in the counter to zero at a time which provides the proper amount of spark advance or retard.

SUMMARY OF THE INVENTION

In accordance with a preferred embodiment of the present invention, a rotating means produces a signal corresponding to a value M amount of rotation thereof, a means produces clock pulses at a fixed rate and a means is responsive to the signal and to the clock pulses for generating a value representing the number of clock pulses in a unit amount X° of angular rotation, where M is unequal to X. A means is responsive to the generated value, to the clock pulses, and to a value representing a desired amount N° of rotation of the rotating means for producing a signal marking the amount N° of rotation.

BRIEF DESCRIPTION OF THE DRAWING

FIG. 2 is a Table of values useful for explaining the operation of the embodiment of FIG. 1.

DETAILED DESCRIPTION OF A PREFERRED EMBODIMENT

Figure 1:
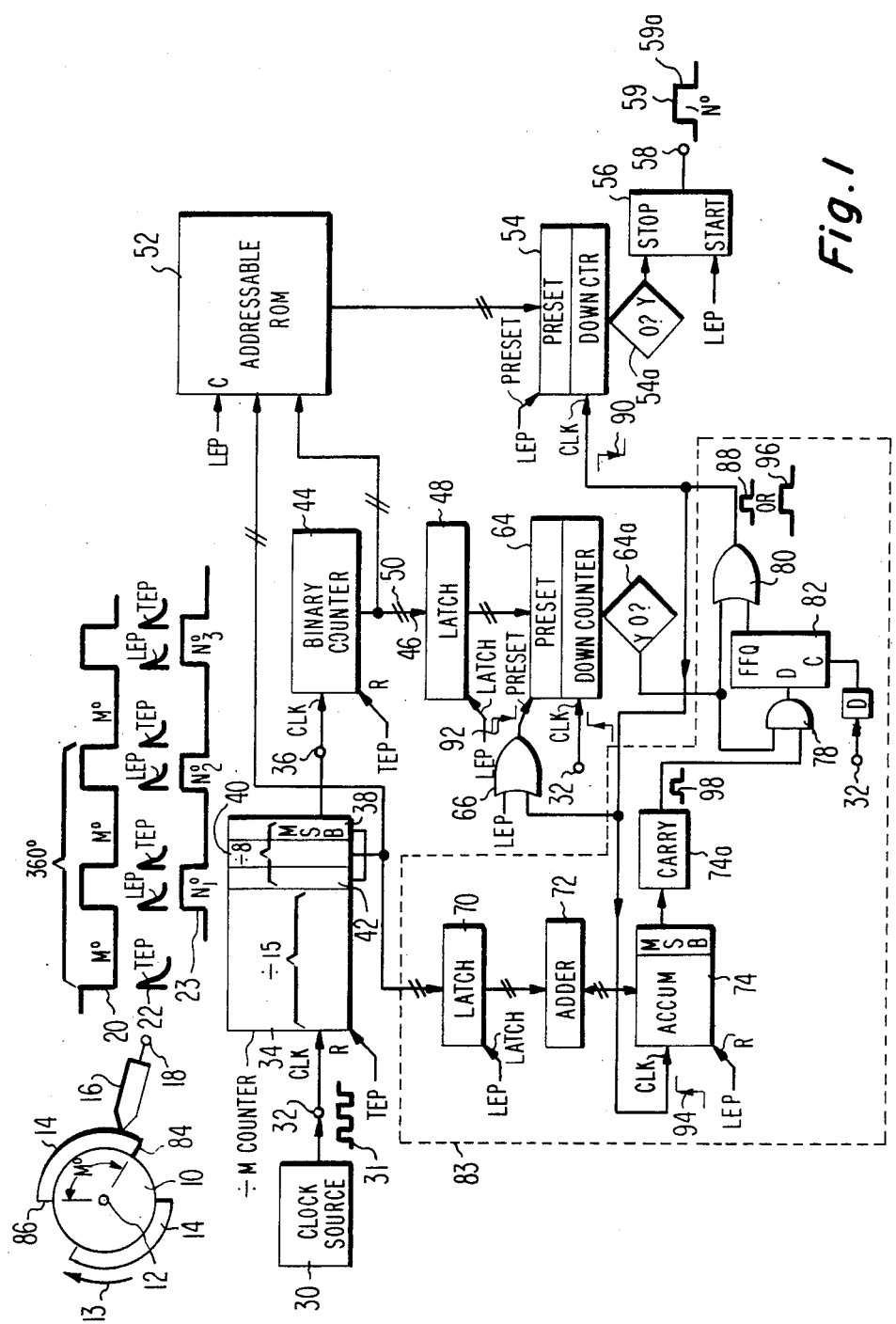
FIG. 1 is a block diagram in electronic form of a preferred embodiment of the present invention with, portions of waveforms shown at various places to help in the description of the operation.

With reference to FIG. 1, element 10 represents a rotating part rotatable about a central axis 12 in the direction indicated by arrow 13. Element 10, by way of example, may be a distributor or other part functionally connected to rotate with the crankshaft of a spark type internal combustion engine (not shown). Element 10 includes a pair of raised or otherwise unique portions 14, each occupying M° of rotation, which cooperates with a suitable pickup device 16 to produce at terminal 18 the waveform illustrated at 20. Waveform 20 is a plot of angle of rotation of element 10 on the horizontal axis versus signal amplitude at terminal 18 on the vertical axis.

The particular type of portion 14 and pickup device 16 are arbitrary. Portion 14 could simply be mechanical or optical start and stop pulses and device 16 could simply produce the electrical equivalent of the pulses or could contain circuitry to produce a type of waveform illustrated at 20. Other circuitry (not shown) or part of circuit 16 produces the pulses illustrated generally at 22, that is, trailing edge pulses (TEP) marking the beginning of the M° pulses and leading edge pulses (LEP) marking the end of the M° pulses and the beginning or leading edge of N° pulses illustrated as waveform 23 and to be described hereinafter. The TEP and LEP pulses are used to provide a timing to the various elements in FIG. 1 to be described more fully hereinafter. Pulses $N_1°$, $N_2°$ and $N_3°$ of waveform 23 are exemplary N° pulses one, $N_1°$, being equal in angle to the angle between successive M° pulses, another $N_2°$ being of less angle than the angle between successive M° pulses and the third, $N_3°$, being of greater angle than the spacing between successive M° pulses.

A clock source 30 produces periodic clock pulses (see waveform 31) of, for example, 600 kilohertz (KHz) at output terminal 32, which is connected to the clock (CLK) or counting input of a divide-by-M counter 34. The TEP pulses from terminal 18 are directed to the reset (R) input of counter 34 to reset the counter. Hereinafter, for simplicity of description, it will be stated that TEP (or LEP) is connected to a particular input. Counter 34 divides by a number which is equal to or at least related to the M° illustrated in waveform 20. That is, if M=120, then divide-by-M counter divides by 120 or some multiple thereof. Assuming it divides by 120, for each 120 pulses received from clock 30, it produces at its output terminal 36 one pulse.

For reasons to be discussed hereinafter, counter 34 is logically divided into two portions, a divide-by-15 portion storing the least significant bits, and a 3 bit divide-by-8 portion storing the most significant three bits, a most signficant bit (MSB) position 38 storing a bit corresponding to 60 clock pulses received at counter 34, a bit position 40 storing a bit corresponding to 30 clock pulses received at counter 34, and a bit position 42 storing a bit corresponding to 15 clock pulses received at counter 34.

Terminal 36 is connected to the clock (CLK) input of a binary counter 44 while TEP is connected to the reset (R) input thereof. The output of binary counter 44 is connected via a multiconductor cable 46 to the data input of a latch 48 while LEP is connected to the latch enable input thereof. Multiconductor cable 46 and other such cables are indicated as such by a double crosshatch symbol 50.

The output of counter 44 and the three most significant bits output of counter 34 are connected to an addressible ROM 52 to provide part of the address information thereto. The data output of addressible ROM 52 is connected to the data input of a preset down counter 54, while LEP is connected to the preset enable input thereof. The decode zero portion 54a of counter 54 is coupled to one input (labeled stop) of a JK type flip-flop 56 while LEP is connected to the other input thereof (labeled start). The output terminal 58 of flip-flop 56 is the system output terminal producing a pulse illustrated at 59 corresponding to N° of rotation of element 10 in manner to be hereinafter described.

The data output of latch 48 is connected to the data input of a preset down counter 64 while the output of an OR gate 66 is connected to the preset enable input thereof and terminal 32 is connected to the clock (CLK) input thereof. A decode zero logic 64a which is part of down counter 64 produces a pulse at the Y terminal upon the down counter 64 reaching a count of zero.

The three most significant bit positions 38, 40 and 42 of counter 34 are connected to the data input of a latch 70 while LEP is connected to the latch enable input thereof. The output of latch 70 is connected to adder 72 as is accumulator 74. LEP is connected to the reset input of accumulator 74. Accumulator 74 includes a carry circuit 74a, the output of which is connected to one input of an AND gate 78. The Y output of decoder zero 64a is connected to a second input of AND gate 78 and to one input of an OR gate 80. The output of AND gate 78 is connected to the D input of a D type flip-flop 82 while the Q output thereof is connected to the second input of OR gate 80. Terminal 32 is connected by a short delay D to the clock (C) input of flip-flop 82. The output of OR gate 80 is connected to the clock (CLK) input of down counter 54, to the CLK input of accumulator 74 and to one input of OR gate 66, the other input of which is LEP.

Components 70, 72, 74, 74a, 78, 80, 82 within dashed block 83 and the three bit positions 38, 40 and 42 of counter 34 cooperate to act as a fraction accumulation circuit to be described hereinafter.

Operation of the circuit will be described in connection with the Table of FIG. 2 which illustrates various exemplary element 10 speeds and related numbers of interest. The clock rate of clock sourse 30 is assumed to be 600 KHz. Portions 14 of element 10 are assumed to be 120°. In accordance with line 1 of the Table of FIG. 2, it will be assumed that element 10 is rotating at 1,000 rpm, although this information is not known a priori to the circuit of FIG. 1. Upon the recognition by pickup device 16 of the beginning such as 84 of a raised portion 14, a TEP pulse is produced at teminal 18 which resets counters 34 and 44 to zero. During the next 0.02 seconds, while element 10 rotates 120° (60 seconds per minute/[1,000 rpm×3 120° segments in 360°]=0.02), counter 34 counts clock pulses from source 30. 12,000 clock pulses are produced at terminal 32 during the 120° rotation of element 10 (600,000 pulses per second×0.02 seconds). Counter 34 produces one pulse at terminal 36 for each 120 pulses at terminal 32. As each pulse is produced at terminal 36, counter 34 begins counting another 120 pulses. The pulses produced at terminal 36 are counted by counter 34. Thus, at the end of the 120° of rotation marked by the passage of end such as 86 of portion 14 past pickup device 16, counter 34 contains a count of zero and counter 44 contains a count of 100 (12,000 divided by 120). The count of 100 is equal to the number of clock 30 pulses corresponding to 1° of rotation of element 10. Looked at another way, the number 100 in counter 44 represents the number of 1/600,000 seconds for element 10 to rotate one degree.

The LEP pulse marking the passage of end 86 past pickup device 16 latches into latch 70 the three most significant bits of counter 34 (zero in this example), latches into latch 48 the count contained in counter 44 (100), sets flip-flop 56 to start to produce an N° pulse 59 and resets accumulator 74 to zero. It will be understood that counters 34 and 44 continue to be receptive of pulses from source 30 and counter 34 respectively to continue counting but the counts beyond the generation of the signal LEP are of no consequence. The example of the FIG. 2 Table line 1 (and lines 2 and 3) is given purposely so that the number in counter 34 at the generation of the LEP pulse is zero, therefore, fraction circuit within block 83 is not utilized in this example.

Also, at the generation of the LEP pulse, ROM 52 is addressed to produce a number representing a desired number of degrees of rotation of element 10. The method by which ROM 52 is addressed is of no particular consequence to the instant invention, but the addressing scheme may include inputs from counters 34 and 44. For example, in a system in which element 10 is part of a spark-type internal combustion engine, the firing of spark plugs is a function of engine speed and other things, such as the engine vacuum pressure, whether or not the engine is knocking, engine temperature, ambient air pressure, whether the vehicle is being accelerated or not, etc.

In accordance with line 1 of the Table of FIG. 2, the number 60, representing 60°, is loaded into preset down counter 54 by the LEP pulse. The number 60 is arbitrarily chosen but since 60° plus 120° is equal to 180° the termination of the 60° coincides with the start of the next successive M° pulse. In a four cycle, four cylinder engine this represents no advance or retard, a reasonable condition at 1000 rpm.

Continuing with the description of operation, the same LEP pulse which latches the number 100 into latch 48 also via OR gate 66 presets that number 100 into down counter 64. Then clock pulses from source 30 at terminal 32 decrement counter 64 by one for each clock pulse. Thus, when the element 10 has rotated one degree beyond end 86 of portion 14, down counter 64 reaches a count of zero as marked by the production of a pulse at the Y output of decode zero 64a. It will be remembered that the number 100 represents the number of clock 30 pulses in one degree of rotation of element 10 at its rotational speed. Because of the zero count in counter 34 at the time the TEP pulse was produced, there is no output from carry circuit 74a, thus flip-flop 82 never becomes set and the Q output terminal thereof remains low. Therefore the relatively narrow pulse produced by decode zero logic 64a results in a similarly narrow pulse 88 being produced at the output of OR gate 80. The trailing negative-going edge of pulse 88 as indicated by partial waveform 90 clocks down counter 54 to decrement it by a count of one. Also, as indicated by waveform 92, the trailing negative-going edge of pulse 88 enables down counter 64 to receive a new number from latch 48, that is, the number 100. As indicated by partial waveform 94, the pulse from OR gate 80 (partial waveform 94 relates to the positive going, leading edge of either pulse 88 or 96) also clocks accumulator 74 but as previously indicated, since latch 70 contains zero, accumulator 74 is effectively not used in this example.

The above described process repeats 59 more times until counter 54 reaches a count of zero. When counter 54 reaches a count of zero, decode logic 54a produces a pulse at its Y output which resets flip-flop 56 to conclude the pulse started with the presence of the LEP at the start input of flip-flop 56. Because the count of 60 was previously entered into down counter 54, the N° pulse produced at terminal 58 as indicated by pulse 59 will be 60° in width, given the rotation speed of element 10. Pulse $N_1°$ in waveform 23, given an M° pulse of 120°, is 60°. The trailing edge 59a of pulse 59 may be used to perform a useful function, such as firing a spark in an internal combustion spark fired engine.

In accordance with line 2 of the FIG. 2 Table, it will next be assumed that element 10 is rotating at a speed of 2,000 rpm, although again this knowledge is not known a priori to the circuit of FIG. 1. In this example, element 10 rotates through a 120° segment in 0.01 seconds, during which time 6,000 clock pulses are produced by clock source 30 resulting in the number 50 being entered in binary counter 44 at the time that edge 86 of portion 14 passes pickup device 16. Again, because of the numbers chosen, counter 34 will contain a count of zero at the time that the LEP pulse is produced. It will be noted that the number 50 contained in counter 44 is half of the value 100 contained in counter 44 in connection with the previous example. This is consistent since the speed is doubled; therefore, the time to rotate one degree is half as much as in the previous example.

In the case of an internal combustion engine, it is logical that at the speed of 2,000 rpm the spark firing time would be advanced from the spark firing time at a lower speed, thus addressable ROM 54 may output, by way of example, the number 52 representing 8° of advance. The rest of the operation is as described above, that is, the number 50, representing the number of pulses from clock source 30 in one degree of rotation of element 10 at 2,000 rpm is repeatedly entered into preset down counter 64 and counted down to zero at which time preset down counter 54 is decremented by one. Finally, when 52 clock pulses have been entered into down counter 54, the resulting pulse from the decode zero logic 54a Y terminal resets flip-flop 56 to terminate the N° pulse 59 at a width of 52°.

Such a pulse is illustrated as pulse $N_2°$ in waveform 23. It will be realized in connection with waveform 23 that the various pulses $N_1°$, $N_2°$ and $N_3°$ therein illustrated do not follow in succession as illustrated since an engine cannot, for example, immediately speed up from 1000 rpm to 2000 rpm. Rather, they are illustrations of separated points in time.

With reference next to line 3 of the FIG. 2 Table, the engine is assumed to be operating at a speed of 500 rpm. At such a slow speed, it is normal in internal combustion engines that the spark is actually retarded past its neutral position. In the exemplary element 10, as previously mentioned, there is only a 60° segment between the end of one raised portion 14 and the beginning of the next raised portion 14. Yet in accordance with line 3 of the Table of FIG. 2, pulse 59 is to be 62° in width. This presents no problem to the circuit of FIG. 1, since the number 200 in counter 44 when an LEP is produced is already latched into latch 48 when the beginning of a pulse 14 passes pickup device 16 causing it to produce a TEP. Thus counters 34 and 44 can be counting a next interval of a raised portion 14 while latches 70 and 48 and counter 54 continue to count based on information from a previous raised portion 14.

With reference next to line 4 in the Table of FIG. 2, the example of line 4 is similar to the example of line 1 except that the numbers have been chosen such that a fraction will appear in counter 34 unlike the example of line 1. Operation of the circuit with the speed of 995 rpm is as follows. Upon the generation of the TEP pulse resulting in edge 84 of raised portion 14 passing pickup device 16, counters 34 and 44 are reset to zero. Then, for each pulse from clock source 30, counter 34 is incremented by one, being reset at each 120 clock pulses from source 30.

Upon its being reset, counter 34 increments counter 44 by one. Thus, at the time that edge 86 passes pickup device 16, counter 44 will contain a count of 100 while counter 34 will contain a count in binary form equivalent to the number 60. This follows since during 120° of rotation at a speed of 995 rpm, pulse source 30 produces 12,060 clock pulses, equal to 100 groups of 120 pulses with 60 pulses remaining. In the absence of fraction circuit 83, the pulse of N° produced at terminal 58 would be not the desired 60° but rather 59.7° computed as follows:

$$995 \text{ rev/min.} \times 1/60 \text{ min/sec.} \times 360°/\text{rev.} \times 1/600,000 \text{ sec/pulses} \times 100 \text{ pulses/degree} \times 60°$$

where 600,000 is the frequency of clock source 30, 100 is the number stored in binary counter 44 and 60 is the number outputted from ROM 52 as the desired number of degrees. However, with the presence of the fraction circuit, the signal produced at terminal 58 is of the proper duration, i.e., representing 60° of element 10 rotation as described below.

At the time that edge 86 of portion 14 passes pickup device 16 the resulting LEP operates latch 70 to receive the binary value stored in bit positions 38, 40 and 42 of counter 34 and clears accumulator 74 to zero. The LEP applied to latch 48 causes it to accept the value of 100 stored in binary counter 44. The LEP via OR gate 66 causes that same value 100 to be stored in preset down counter 64. The LEP applied to addressable ROM 52 causes it to emit the value 60 in accordance with line 4 of the FIG. 2 Table. The LEP at preset down counter 54 causes that counter to store the value 60. Also, the LEP resets accumulator 74 and places flip-flop 56 into the start position causing the output at terminal 58 to begin to produce pulse of $N_3°$ as illustrated by pulse 59.

At the time that latch 70 is made operational, counter 34 contains a count of 60 which, in reality, amounts to a binary one in the most significant bit position 38 and zeros in the other positions 40 and 42. Thereafter, the next 100 clock pulses at terminal 32 cause down counter 64 to count to a count of zero. When the counter reaches a count of zero, the resulting logic 1 pulse from decode zero logic 64a via OR gate 80 clocks accumulator 74 to add to its own contents (zero) the contents of latch 70 as applied to adder 72 and to store the results in accumulator 74.

At the conclusion of the addition step, accumulator 74 will contain a binary one in its most significant bit (MSB) position. As no carry will be produced, carry circuit 74a produces no output signal and operation continues as previously described in connection with line 1 of the Table of FIG. 2. That is, down counter 54 is decremented by one to 59, based on the output signal from OR gate 80 which results from the production of the logic 1 pulse at decode zero 64a, and preset down counter 64 is loaded with the value 100 once again.

After another 100 clock pulses from clock source 30, preset down counter 64 again reaches a count of zero. The resulting leading edge of the signal from OR gate 80 (see positive-going waveform 94) causes accumulator 74 to again add its contents with the contents of latch 70 as applied to adder circuit 72.

As a result, the most significant bit position of accumulator 74 goes to a value of zero and a carry pulse is produced, causing carry circuit 74a to output a momentary logic 1 pulse 98. The timing of that pulse is such that it is still present when clock 30 produces the pulse immediately following that pulse which decremented counter 64 to zero. After a slight delay occasioned by delay D, that next pulse causes flip-flop 82 to become set such that the Q output becomes a logic 1. Thus, the resulting logic 1 pulse from OR gate 80 as illustrated in waveform 96 is lengthened relative to the pulse 88 produced thereby when flip-flop 82 does not become set.

Since the pulse produced by carry circuit 74a is only of a momentary nature such that when the second clock pulse at terminal 32 following that clock pulse which caused preset down counter to reach a count of zero, occurs, the carry pulse is no longer present at AND gate 78 and the resulting clock pulse causes flip-flop 82 to be reset such that the Q output becomes a logic 0 level. The net effect is that the trailing or logic 0-going edge of pulse 96 relative to that of pulse 88 is delayed by the time between two successive clock pulses from clock source 30. As a result of the lengthened pulse 96, and as a result of the fact that down counter 64 becomes preset on the negative-going edge of the pulse supplied to its preset input, counter 64 is delayed in being set to a count of 100 by the time of one clock pulse from source 30.

Similarly, down counter 54 which is clocked on the negative-going edge of a clock signal applied thereto, is delayed in being decremented by the time of one clock pulse from source 30. Although this delay is of no particular importance at this time, should a carry pulse occur as down counter 54 is being counted down to a count of zero (as will be the case with the exemplary values on line 4 of the FIG. 2 Table) the count to zero will be delayed, thus delaying slightly the setting of flip-flop 54 into its stop position and thus the lengthening of the N° pulse 59 by the clock source 30 pulse time.

The operation above described continues such that every two times that down counter 64 reaches a count of zero, the setting of the down counter back to a count of 100 will be delayed by the amount of one clock pulse. This delay occurs thirty times during the count of down counter 54 from a count of 60 to a count of zero. 30 pulses divided by 600,000 pulses per second is equal to 0.00005 seconds. The resulting extra thirty increments, when added, result in a delay of producing the pulse from decode zero logic 54a by an amount of time corresponding to an extra 0.3° of rotation of element 10, thus producing a pulse 59 corresponding to the desired 60° of rotation of element 10.

It will be understood that the fraction circuit 83 does not in all cases give perfect results, but any reasonable desired accuracy may be obtained by utilizing an appropriate number of bits from counter 34 in the fraction circuit 83.

It will be realized that the rpm values given in the Table of FIG. 2 are only by way of example, that the desired number of degrees corresponding to numbers outputted from ROM 52 are only by way of example, that the clock pulse frequency is only an example, and that the 120° of rotation of element 10 and resulting division by 120° in counter 34 are also only by way of example. It will also be realized that if the element 10 is either speeding up or slowing down during the generation in binary counter 44 of the number of counts referring to one degree of rotation, that number will be slightly in error and as a result, the pulse corresponding to N° of rotation generated at terminal 58 will be slightly in error. However, at least in an internal combustion engine, the amount of speed up or slow down in one-half of a revolution will not be so great as to materially affect the size of the output pulse produced. Furthermore, it is not necessary that binary counter 44 contain the number of counts in one degree of revolution. The number of degrees could be increased or decreased simply by dividing by a different value in counter 34. That is, for example, if counter 34 divides by 480 and the raised segment 14 remains at 120° then the number stored in counter 44 will be a number representing the number of clock pulses in one-fourth of a degree of rotation of element 10.

What is claimed is:

1. The combination comprising:
   a rotating means producing a signal corresponding to a given value M in degrees of angular rotation;
   means producing clock pulses at a fixed frequency;
   means responsive to said signal and to said clock pulses for generating a value representing the number of clock pulses in a unit value X in degrees of angular rotation of said rotating means, where X is unequal to M and
   means responsive to said generated value and to said clock pulses and to a value representing a desired rotational value N° of the rotating means for producing a signal marking N° of rotation of said rotating means following the M° of rotation thereof.

2. The combination as set forth in claim 1 wherein said means responsive to said signal comprises means for producing a unit pulse for each M clock pulses it receives and means responsive to said unit pulses for counting the number of unit pulses received thereat.

3. The combination as set forth in claim 2 further including down counter means responsive to said means for counting the number of unit pulses received thereat for counting to zero at a rate determined by said clock pulse frequency.

4. The combination as set forth in claim 3 further including means coupled to said means for producing an output pulse for each M clock pulses received thereby for latching a value stored therein when said rotating means has produced said signal corresponding to a given value M in degrees of angular rotation and means for accumulating said latched value at a rate determined by the rate at which said down counter counts zeros and means for producing a carry sum when the accumulated value is equal to or greater than the value M, said carry pulses being used to lengthen the value N.

5. The combination comprising:
   a rotating means producing a signal corresponding to a given value M in degrees of angular rotation;
   means producing clocks pulses at a fixed frequency;
   means responsive to said signal and to said clock pulses for generating a value representing the number of clock pulses in a unit value X in degrees of angular rotation of said rotating means, where X is unequal to M, said means responsive to said signal comprising means for producing a unit pulse for each M clock pulses it receives and means responsive to said unit pulses for counting the number of unit pulses received thereat.
   down counter means responsive to said means for counting the number of unit pulses received thereat for counting to zero at a rate determined by said clock pulse frequency; and
   means coupled to said means for producing a unit pulse for each M clock pulses received thereby for latching a value stored therein when said rotating means has produced said signal corresponding to a given value M in degrees of angular rotation and means for accumulating said latched value at a rate determined by the rate at which said down counter counts zeros and means for producing a carry sum when the accumulated value is equal to or greater than the value M, said carry pulses being used to lengthen the value N.

* * * * *